United States Patent
Stout

(10) Patent No.: US 6,209,210 B1
(45) Date of Patent: Apr. 3, 2001

(54) LEVELING ROD

(76) Inventor: Joel A Stout, 4610 Grand Central Ave., Vienna, WV (US) 26105

( * ) Notice: Subject to any disclaimer, the term of this patent is extended or adjusted under 35 U.S.C. 154(b) by 0 days.

(21) Appl. No.: 09/261,376

(22) Filed: Mar. 3, 1999

(51) Int. Cl.⁷ .................................................. G01C 15/00

(52) U.S. Cl. .............................................. 33/293; 33/296

(58) Field of Search .............................. 33/295, 293, 294, 33/296, 809, 810

(56) References Cited

U.S. PATENT DOCUMENTS

| | | | |
|---|---|---|---|
| 419,711 | * | 1/1890 | Rogers ..................................... 33/295 |
| 4,029,415 | * | 6/1977 | Johnson ................................... 33/294 |
| 4,471,532 | * | 9/1984 | Francis ..................................... 33/294 |
| 4,899,452 | * | 2/1990 | Schafer ..................................... 33/296 |
| 6,011,628 | * | 1/2000 | Tullis ....................................... 33/293 |

\* cited by examiner

Primary Examiner—Christopher W. Fulton

(57) ABSTRACT

A leveling rod is provided for determining whether a point in question is higher or lower than a bench mark elevation and measuring how high or how low the point is relative to the benchmark elevation. The leveling rod includes a top unit and a bottom unit. Each unit contains a pair of elongated telescoping tubes and a clamp to secure the tubes at any degree of extension. The inside tubes of each unit are detachably coupled to form a rod such that when held upright the outside tube of the top unit extends up and the outside tube of the bottom unit extends down. The outside bottom tube has a base end for engaging the surface to be surveyed. The outside tube of the top unit has a window with a reference mark centered vertically thereon. This window allows the surveyor to view a scale which is carried by the inside tube of the top unit. The scale indicates to the user whether the point being surveyed is higher or lower and measures how high or how low the point is relative to the bench mark elevation

9 Claims, 5 Drawing Sheets

LEVELING ROD

TECHNICAL FIELD AND BACKGROUND OF THE INVENTION

This invention relates to a leveling rod for determining whether a point in question is higher or lower than a bench mark elevation and measuring how high or how low the point is relative to the benchmark elevation. The invention is particularly applicable for use in combination with laser beam level instruments used in surveying. One such instrument is described in U.S. Pat. No. 4,221,483 issued to Spectra—Physics, Inc. of Mountain View, Calif. The complete disclosure of this patent is incorporated herein by reference.

A conventional laser beam level instrument is mounted on a tripod and operates by projecting a rotating laser beam in a horizontal plane over an area to be surveyed. The laser beam is detected by a small portable electronic receiver slidably mounted to an elongated rod held upright by the surveyor. When the receiver is near horizontal alignment with the plane of the rotating laser, the receiver audibly beeps intermittently and an LCD arrow is displayed to indicate to the user whether the receiver needs to be moved up or down to achieve alignment. When the receiver is in horizontal alignment with the plane of the rotating laser beam it emits a continuous audible beep indicating this condition to the user.

A common prior art method requires the surveyor to note the point on the rod where the receiver beeps continuously while the base of the rod is on a benchmark elevation. The surveyor then places the base of the rod at a point in question and slides the receiver along the rod vertically as required to cause the receiver to beep continuously. The surveyor must then calculate the distance from the present location along the rod to the point representing the benchmark elevation and determine whether that distance indicates a measurement higher or lower then the bench mark elevation. This common prior art technique is time consuming and susceptible to miscalculations.

Another prior art technique involves using a grade rod described in U.S. Pat. No. 5,687,486 issued to Dennis Eugene Foltz and assigned to Earnhardt Equipment Company. The complete disclosure of this patent is incorporated herein by reference. This grade rod provides for determining, how high a point in question is above a bench mark elevation. The grade rod of this type has several drawbacks. Namely, the grade rod mentioned above does not provide any means for surveying a point that is below the bench mark elevation. Secondly, the tripod must be positioned at the bench mark elevation. Thirdly, the grade rod mentioned above will only survey relatively flat areas having 1 foot or less grade variation. Finally, the scale appears out of the top of the rod making it difficult to read.

The present invention speeds and simplifies the process by providing a telescoping leveling rod with a graduated scale for easily determining at a glance whether a point is higher or lower than a bench mark elevation and precisely measuring how high or how low the point in question is relative to the bench mark elevation. The present invention also provides for easily exchangeable bottom units, enabling the surveyor to utilize a longer bottom unit while checking the grade in the bottom of a ditch or similar applications. The present invention provides for surveying areas having up to 3 feet in grade variation.

SUMMARY OF THE INVENTION

Therefore, it is an object of this invention to provide a leveling rod for use with a laser beam level instrument which reduces the amount of time, energy, and skill required to topographically survey an area.

It is another object of this invention to provide a leveling rod which includes a graduated scale for indicating to the surveyor whether a point in question is higher or lower than a bench mark elevation and precisely measuring how high or how low the point is relative to the bench mark elevation.

It is another object of this invention to provide a leveling rod wherein the graduated scale is located in alignment with the reference mark and the receiver for being easily read by the surveyor while maintaining the rod in an upright position.

It is another object of this invention to provide a leveling rod wherein the top and bottom units can be simply detached for easy storage and transportation of the leveling rod.

It is another object of this invention to provide a leveling rod with exchangeable bottom units allowing a wide variation between the tripod elevation and the bench mark elevation.

It is another object of this invention to provide a leveling rod which is relatively inexpensive to manufacture.

These and other objects of the present invention are achieved in the preferred embodiment by providing a leveling rod for surveying a point and indicating whether that point is higher or lower than a bench mark elevation and measuring how high or how low that point is relative to the bench mark elevation. The leveling rod includes a top unit and a bottom unit. Each unit contains a pair of elongated telescoping tubes and a clamp to secure the tubes at any degree of extension. The inside tubes of each unit are detachable coupled to form a rod such that when held upright the outside tube of the top unit extends up and the outside tube of the bottom unit extends down. The outside bottom tube has a base end for engaging the surface to be surveyed. The outside tube of the top unit has a window with a reference mark centered vertically thereon. This window allows the surveyor to view a scale which is carried by the inside tube of the top unit. The scale indicates to the user whether the point being surveyed is higher or lower than the bench mark elevation and measures how high or how low the point is relative to the bench mark elevation

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT

Figure 1:
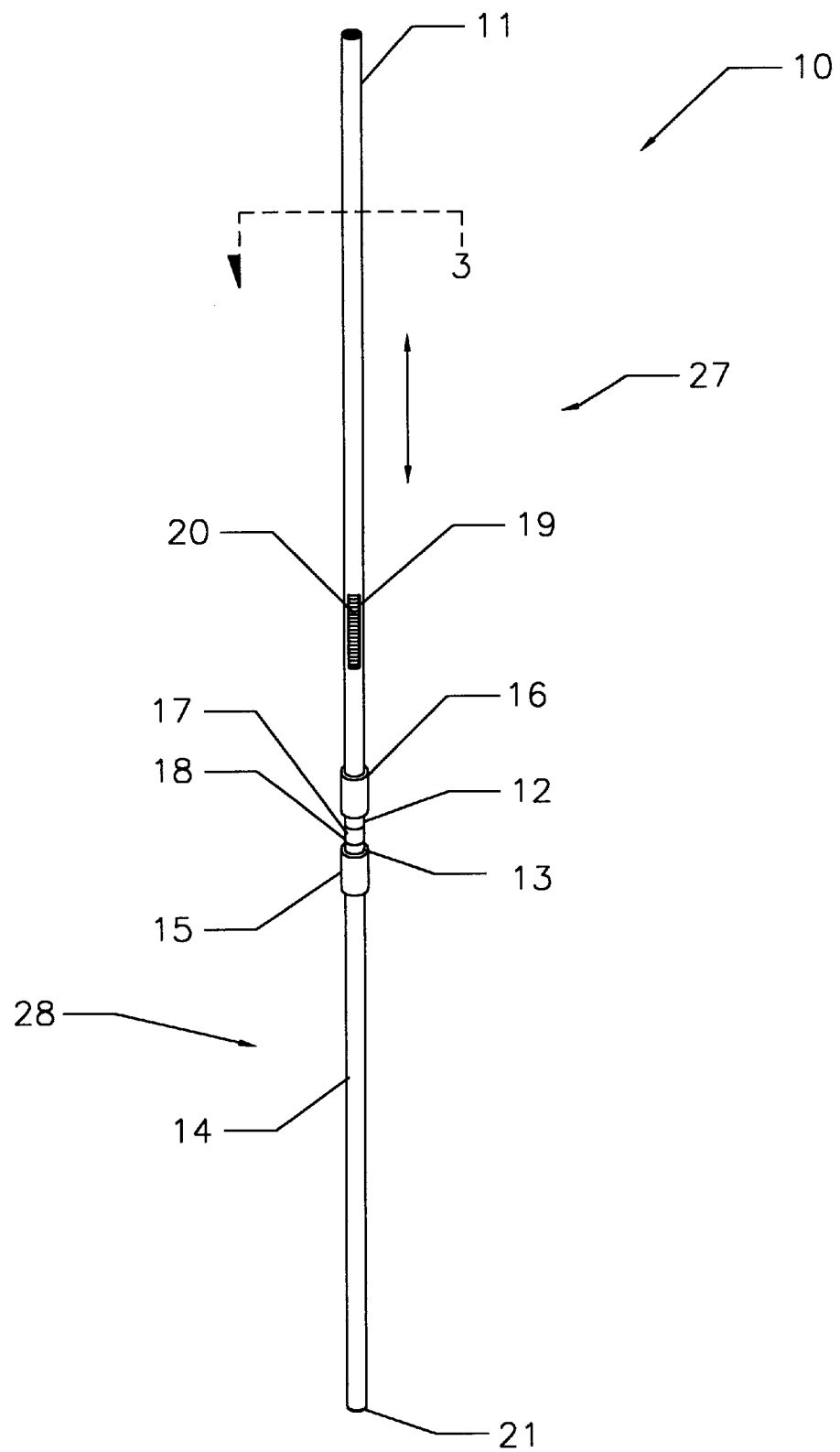
FIG. 1 is a perspective view of the leveling rod according to one preferred embodiment of the invention.
Figure 2:
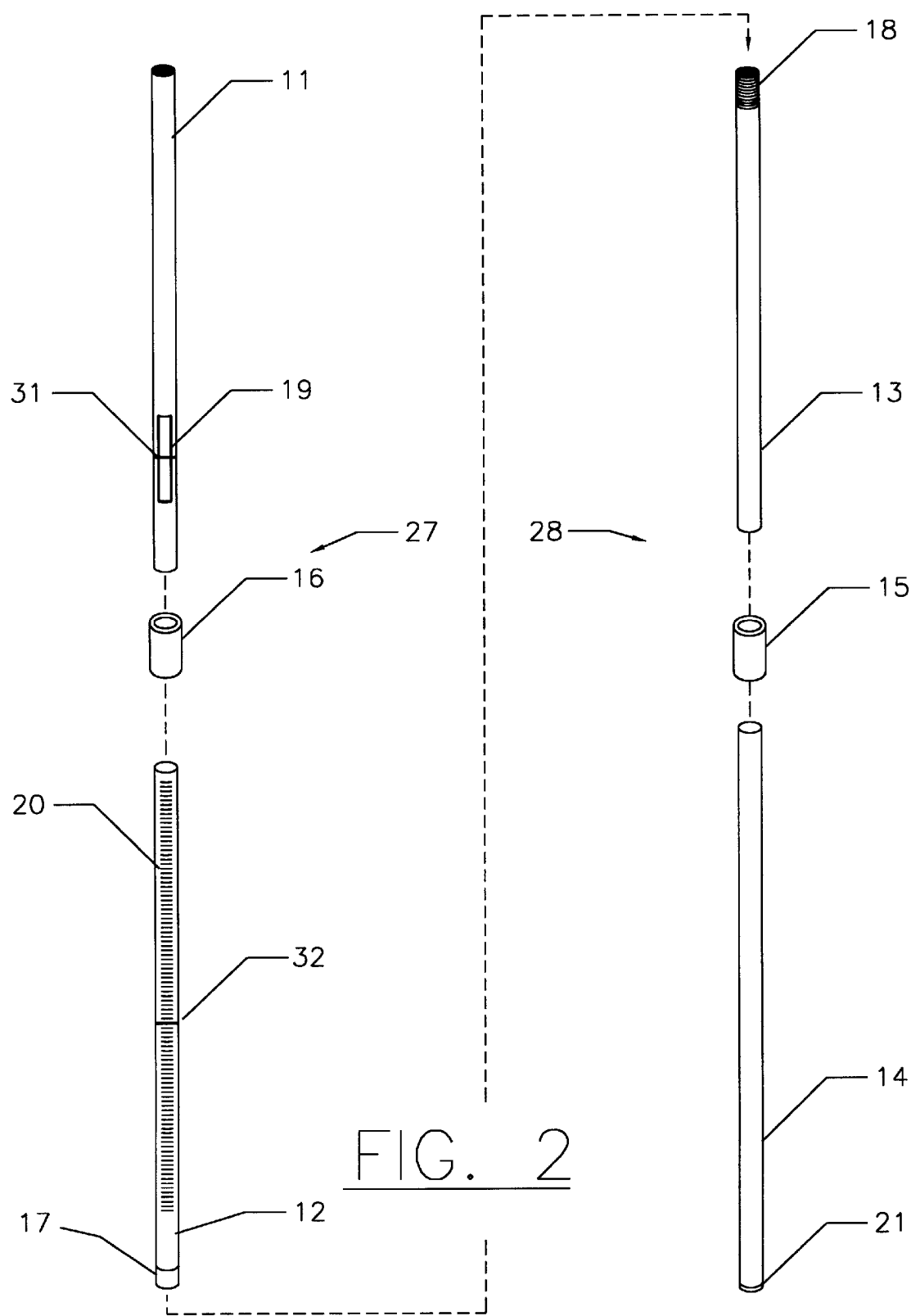
FIG. 2 is an exploded view of the leveling rod illustrating its components.
Figure 3:
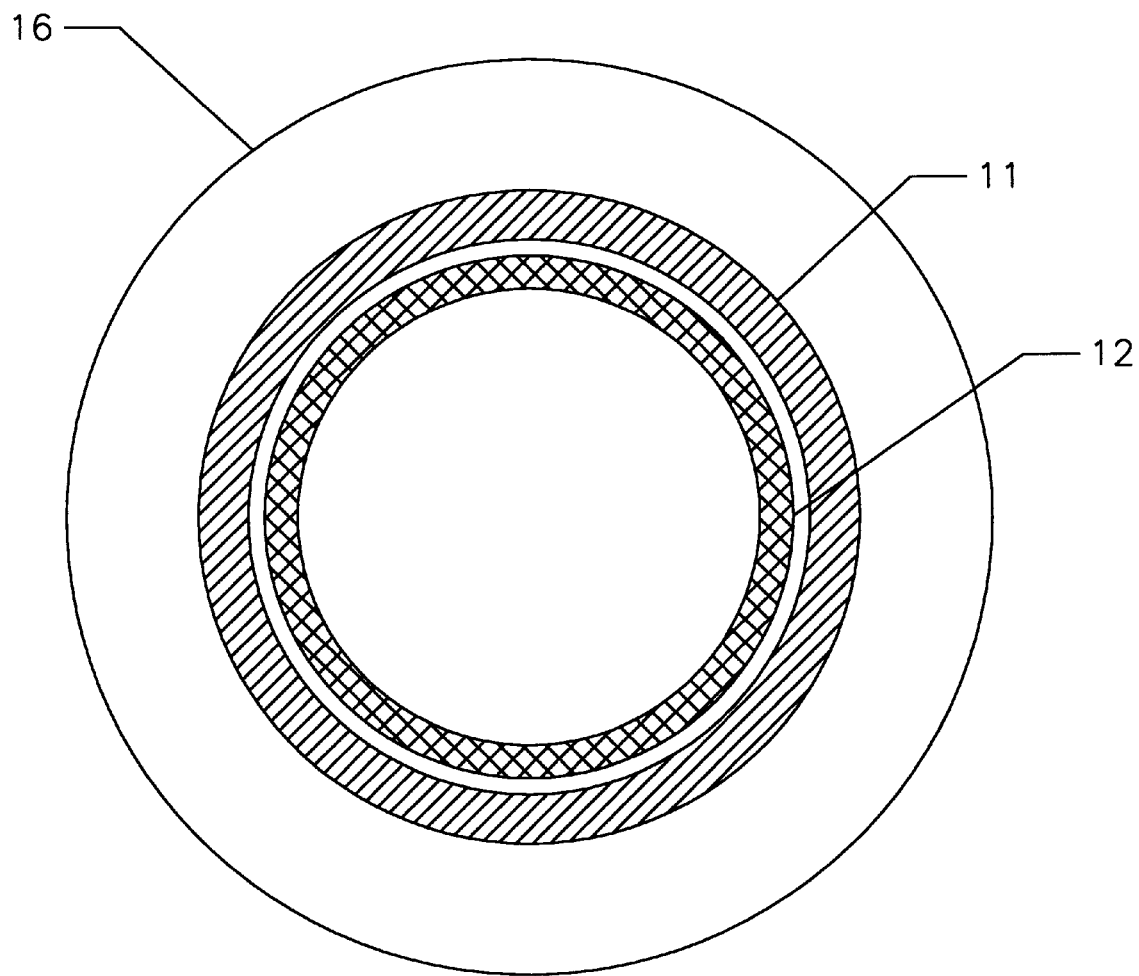
FIG. 3 is a cross sectional view of the leveling rod taken substantially along line 3 of FIG. 1.

Referring now specifically to the drawings, a leveling rod according to the present invention is illustrated in FIG. 1 and shown generally at reference numeral 10. The leveling rod 10 is particularly useful in combination with a standard laser beam level instrument 23 (see FIGS. 4–6) such as disclosed in U.S. Pat. No. 4,221,483. The leveling rod 10 is used primarily for fine grading of a ditch, base, final grade or grade stakes. Operation of the leveling rod 10 and level instrument 23 are described further below with reference to FIGS. 4–6. Referring to FIGS. 1–3, the leveling rod 10 includes a top unit 27 and a bottom unit 28. The top unit 27 contains an elongated inside tube 12 and an elongated outside tube 11. The inside tube 12 carries a scale 20 and is slidably received within the outside tube 11. The outside tube 11 has a window 19 with a reference mark 31 centered vertically thereon, The scale 20 is marked zero at its vertical center 32 and is marked off in units and denominate numbers that increase as they proceed up away from the center 32 and is marked off in units and denominate numbers that increase as they proceed down away from the center 32. The scale 20 is shaded red above the center 32 and shaded green below the center 32. A clamp 16 secures the inside tube 12 and the outside tube 11 at the position where the center 32 is in alignment with the reference mark 31. The clamp 16 also secures the top unit 27 in a compressed position for storage and transportation. A coupling 17 is attached to the lower end of the inside tube 12 for detachable connecting the bottom unit 28.

The bottom unit 28 contains and elongated inside tube 13 and an elongated outside tube 14. The inside tube 13 is slidably received within the outside tube 14. The outside tube 14 has a base end 21 for engaging the surge being surveyed. The inside tube 13 has attached to its top end, a mate 18 to the coupler 17. A clamp 15 is capable of securing the bottom unit 28 at any degree of extenstion Operation of the Leveling Rod 10 and Laser Beam Level Instrument 23

Figure 4:
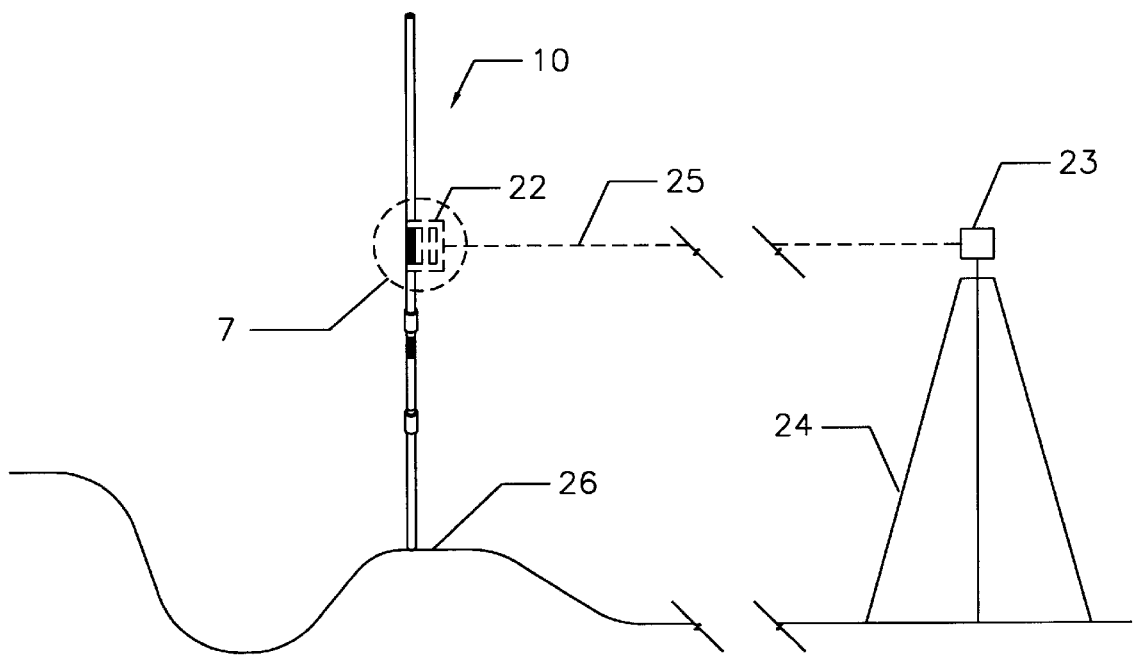
FIG. 4 is an environmental view of the leveling rod and level instrument with the leveling rod set at zero at a bench mark elevation.
Figure 5:
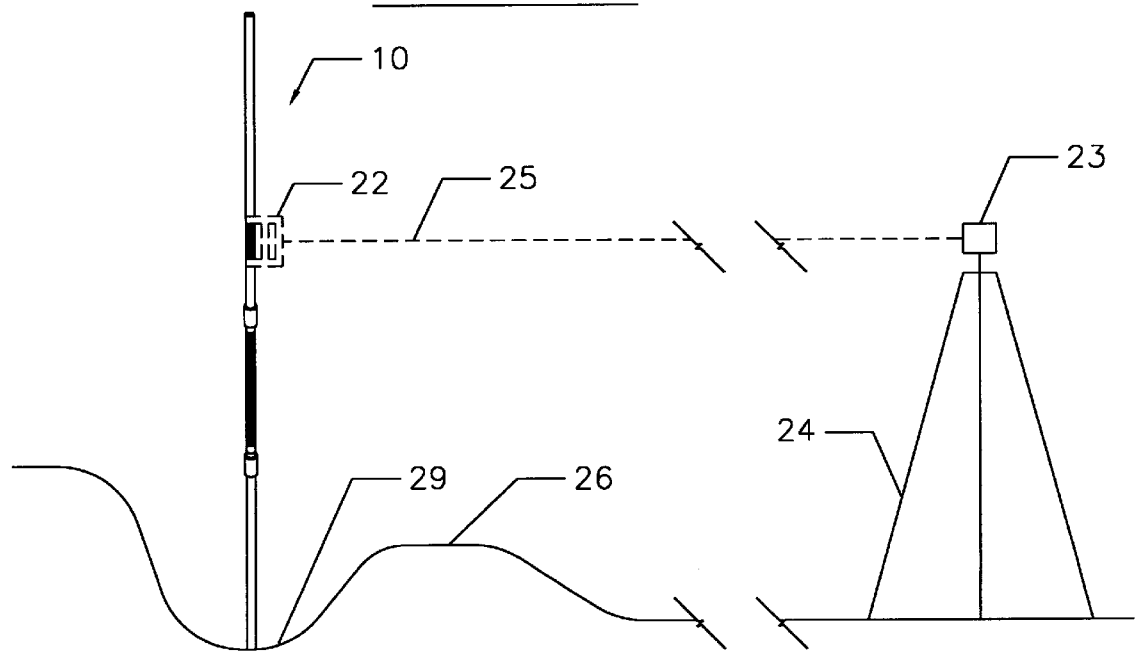
FIG. 5 is a second environmental view of the leveling rod and level instrument with the leveling rod surveying a point below the bench mark elevation.
Figure 6:
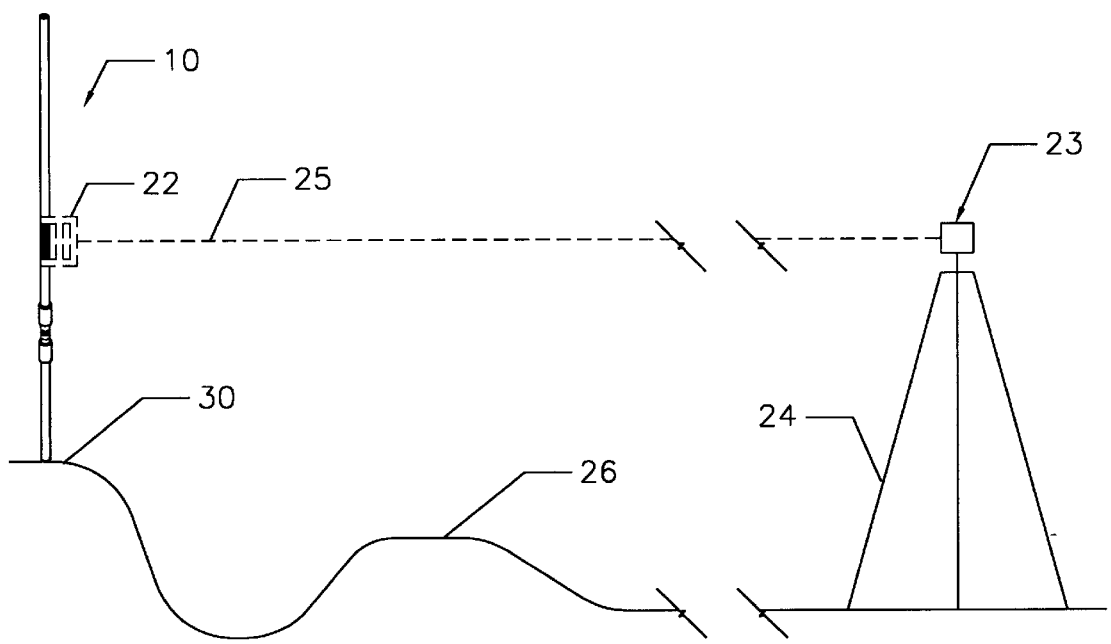
FIG. 6 is a third environmental view of the leveling rod and level instrument with the leveling rod surveying a point above the bench mark elevation.

Referring to FIGS. 4–6 the level instrument 23 is mounted on a tripod 24 and operates by projecting a rotating laser beam 25 in a horizontal plane over an area being surveyed. The term "Bench mark elevation" 26 is used herein to refer to a point from which relative elevations may be determined. The laser beam 25 is detected by a small portable electronic receiver 22 removable attached to the top unit 27 of the leveling rod 10. When the receiver 22 is near horizontal alignment with the plane of the rotating laser beam 25, the receiver 22 intermittently beeps and an LCD arrow is displayed indicating to the user whether the receiver 22 needs to be moved up or down to achieve alignment. When the receiver 22 is in horizontal aliment with the laser beam 25 it emits a continuous beep to indicate this condition to the user.

Figure 7:
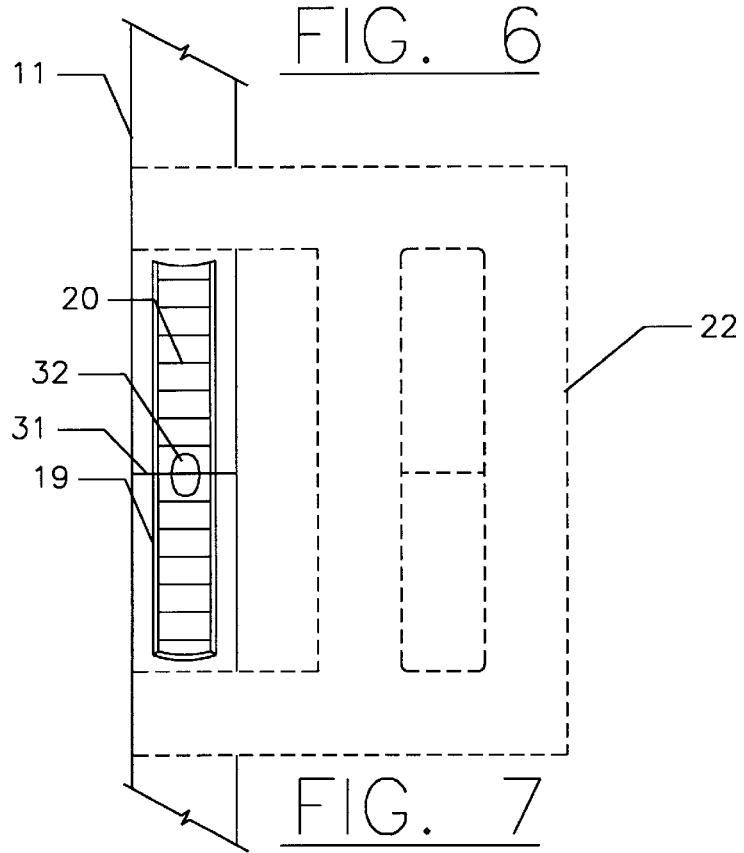
FIG. 7 is a partial view of FIG. 4 showing the area enclosed by the dashed circle labeled 7.

As shown in FIGS. 4 & 7, to begin surveying an area; first the top unit 27 is secured using the clamp 16 at the position where the reference mark 31 and the scale center 32 are aligned horizontally. The receiver 22 is then removable attached to the outside tube 11 so that it is also aligned horizontally with the reference nark 31. Then as shown in FIG. 4 the leveling rod 10 is held upright with the base end 21 on the bench mark elevation 26. The clamp 15 is then released. Then, while the base end 21 is held down against the bench mark surface 26 by gravity, the top unit 21 and inside tube 13 are adjusted vertically as required to achieve horizontal alignment with the laser beam 25. The bottom unit 28 is then secured at that position with the clamp 15.

To survey an area below the bench mark elevation (FIG. 5) first release the clamp 16, then the outer tube 11 is adjusted vertically as required to achieve horizontal alignment with the laser beam 25. This exposes a red portion of the scale 20 in the window 19 indicating that the point being surveyed 29 is lower than the bench mark elevation 26. The scale 20 also measures precisely how much lower the point being surveyed 29 is relative to the bench mark elevation 26.

To survey an area above the bench mark elevation (FIG. 6), the leveling rod 10 is held upright at the point being surveyed 30 and the outside tube 11 is adjusted vertically as required to achieve horizontal alignment with the laser beam 25. This exposes a green portion of the scale 20 in the window 19 indicating that the point being surveyed 30 is higher than the bench mark elevation 26. the scale 20 also measures precisely how much higher the point being surveyed 30 is relative to the bench mark elevation 26.

The leveling rod may be constructed of any suitable material such as fiberglass, steel, wood, plastic, aluminum or the like. The tubes may have cross sectional shapes such as round, square, rectangular or the like. In addition the tubes in each unit can be slidably attached adjacent to each other rather than one within the other.

A leveling rod is described above. Various details of the invention may be changed without departing from its scope. Furthermore, the foregoing description of the preferred embodiment of the invention and the best mode for practicing the invention are provided for the propose of illustration only and not for the propose of limitation—the invention being defined by the claims.

I claim:

1. A leveling rod for determining whether a point being surveyed is higher or lower than a bench mark elevation and for measuring how high or how low the point being surveyed is relative to the bench mark elevation, comprising:

(a) a top unit and a bottom unit;
   (b) said top unit having:
      a reference member with a reference mark thereon;
      a scale member;
      a scale means on said scale member for indicating whether the point being surveyed is higher or lower than the bench mark elevation and for measuring how high or how low the point being surveyed is relative to the bench mark elevation;
      said reference member and said scale member adjacently slidably attached being vertically moveable relative to each other along a longitudinal axis;
      a coupling attached to the lower end of said top unit for detachably connecting said bottom unit; and
      a first clamp means for securing said reference mark at a point relative to said scale means;
   (c) said bottom unit having:
      a connecting member and a base member;
      said connecting member and said base member adjacently slidably attached being vertically moveable relative to each other along a longitudinal axis;
      a mate to said coupling of said top unit attached to the top end of said connecting member for connecting said top unit to said bottom unit;
      a bottom of said base member having a base end for engaging the point being surveyed; and
      a second clamp means for securing said base end a spaced distance from one of said reference mark and said scale means.

2. The leveling rod according to claim 1, wherein said scale means is a label marked off in units with zero located at its vertical center for indicating that the point being surveyed is equal in elevation to the bench mark elevation and denominate numbers that increase as they proceed up away from said center for measuring how low the point being surveyed is relative to the bench mark elevation and denominate numbers that increase as they proceed down away from said center for measuring how high the point being surveyed is relative to the bench mark elevation.

3. The leveling rod according to claim 2, wherein that portion of said label above said center is shaded a first color and that portion of said label below said center is shaded a second color.

4. The leveling rod according to claim 3, wherein said first color is red and said second color is green.

5. A leveling rod for determining whether a point being surveyed is higher or lower than a bench mark elevation and for measuring how high or how low the point being surveyed is relative to the bench mark elevation, comprising:

(a) a top unit and a bottom unit;
(b) said top unit having:
  a pair of elongated telescoping tubes, an inside tube within an outside tube;
  said outside tube of said top unit having a window with the vertical center thereof marked for reference;
  a coupling is attached to the lower end of said inside tube of said top unit for detachably connecting said bottom unit;
  a scale means carried by said inside tube of said top unit for viewing through said window of said outside tube and indicating whether the point being surveyed is higher or lower than the bench mark elevation and measuring how high or how low the point being surveyed is relative to the bench mark elevation, wherein said scale means is a label marked off in units with zero located at said vertical center for indicating that the point being surveyed is equal in elevation to the bench mark elevation and denominate numbers that increase as they proceed up away from said vertical center for measuring how low the point being surveyed is relative to the bench mark elevation and denominate numbers that increase as they proceed down away from said vertical center for measuring how high the point being surveyed is relative to the bench mark elevation and with that portion of said label above said vertical center shaded a contrasting color relative to the shading on the portion of said label below said vertical center for distinguishing the point being surveyed below the bench mark elevation from the point being surveyed above the bench mark elevation; and
  a clamp mounted on the lower end of said outside tube of said top unit for temporarily securing the scale at zero relative to said reference mark;
(g) said bottom unit having:
  a pair of elongated telescoping tubes, an inside tube within an outside tube;
  said outside tube of said bottom unit having a base end for engaging the point being surveyed and a clamp mounted on the top end of said bottom unit for securing said inside tube of said bottom unit to maintain said base end a spaced distance from said scale means; and
  a mate to said coupling on said inside tube of said top unit is attached to the top end of said inside tube of said bottom unit.

6. The leveling rod according to claim 5, wherein that portion of said label above said vertical center is red and that portion of said label below said center is shaded green.

7. A method for determining with a leveling rod whether a point being surveyed is higher or lower than a bench mark elevation and for measuring how high or how low the point being surveyed is relative to the bench mark elevation, the method comprising the steps of:

a. initializing the leveling rod, the leveling rod comprising: a top unit, a bottom unit, and a coupling means for detachably connecting the top unit and the bottom unit, the top unit having:
  a reference member with a reference mark thereon;
  a scale member slidably attached to the reference member;
  a scale means on the scale member for indicating whether the point being surveyed is higher or lower than the bench mark elevation and for measuring how high or how low the point being surveyed is relative to the bench mark elevation, wherein the scale means is marked off in units with zero located at a vertical center and denominate numbers that increase as they proceed up away from the vertical center and denominate numbers that increase as they proceed down away from the vertical center; and
  a clamp means for securing said reference member at a point relative to said scale member;
the bottom unit having:
  a connecting member;
  a base member slidably attached to the connecting member;
  a base end at a bottom of the base member for engaging the point being surveyed; and
  a clamp means for securing the base end a spaced distance from the reference mark,
wherein said initializing of the leveling rod comprises securing the reference member of the top unit of the leveling rod to the scale member such that the reference mark on the reference member is aligned horizontally with the vertical center of the scale means;

b. attaching a survey laser receiver to the top unit such that it aligns horizontally with the reference mark on the reference member of the top unit;
c. placing the bottom end of the bottom unit on the benchmark elevation;
d. adjusting vertically the connecting member of the bottom unit in relation to the base member of the bottom unit until the survey laser receiver is aligned with a surveying laser beam;
e. securing the connecting member to the base member;
f. moving the leveling rod to the point to be surveyed;
g. adjusting vertically the reference member of the top unit until the survey laser receiver aligns horizontally with the surveying laser beam; and
h. indicating on the scale member a distance between the point being surveyed and the benchmark elevation, wherein the distance indicates how high or how low the point being surveyed is relative to the bench mark elevation.

8. The method according to claim 7, wherein that portion of the scale means above the vertical center is shaded a first color, and that portion of the scale means below the vertical center is shaded a second color.

9. The method according to claim 8, wherein the first color is red and the second color is green.

* * * * *